(12) United States Patent
Nagara et al.

(10) Patent No.: US 7,006,412 B2
(45) Date of Patent: Feb. 28, 2006

(54) OPTICAL DISK DRIVE AND OPTICAL DISC RECORDING METHOD

(75) Inventors: Toru Nagara, Tokyo (JP); Hitoshi Okada, Chiba (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 10/415,661

(22) PCT Filed: Sep. 11, 2002

(86) PCT No.: PCT/JP02/09246

§ 371 (c)(1),
(2), (4) Date: May 8, 2003

(87) PCT Pub. No.: WO03/025920

PCT Pub. Date: Mar. 27, 2003

(65) Prior Publication Data
US 2004/0042364 A1    Mar. 4, 2004

(30) Foreign Application Priority Data
Sep. 13, 2001    (JP)    ............................. 2001-277458

(51) Int. Cl.
   *G11B 7/00*    (2006.01)

(52) U.S. Cl. ................................ 369/44.41; 369/47.52
(58) Field of Classification Search .............. 369/44.41
   See application file for complete search history.

(56) References Cited

U.S. PATENT DOCUMENTS

| 6,246,660 B1 * | 6/2001 | Yanagawa ................. 369/116 |
| 2004/0156286 A1 * | 8/2004 | Miyaki ..................... 369/47.53 |

FOREIGN PATENT DOCUMENTS

| JP | 64-50246 | 2/1989 |
| JP | 2000-76653 | 3/2000 |

OTHER PUBLICATIONS

English translation of JP 2000-076653.*

* cited by examiner

*Primary Examiner*—A. L. Wellington
*Assistant Examiner*—Lixi Chow
(74) *Attorney, Agent, or Firm*—Oblon, Spivak, McClelland, Maier & Neustadt, P.C.

(57) ABSTRACT

The present invention makes it possible to control a writing light quantity by selectively using a light quantity detection result S0 (C+D) obtained from areas C and D at the back side in the direction of scanning with laser beams when data is recorded onto an organic dye type recording medium, such as a CD-R (compact disk recordable).

5 Claims, 6 Drawing Sheets

OPTICAL DISK DRIVE AND OPTICAL DISC RECORDING METHOD

BACKGROUND OF THE INVENTION

1. Technical Field

The present invention relates to an optical disk device and an optical disk recording method, and may be used to record data onto, for example, an organic dye type recording medium such as a CD-R (compact disc recordable). The present invention makes it possible to, even if writing speed is high, accurately monitor, for example, the shape of a pit which is formed in an optical disk by selectively using light quantity detection results obtained from areas at the back side in a direction of scanning with laser beams.

2. Background Art

Hitherto, in an optical disk device, data recorded on an optical disk has been reproduced by generating a reproduction signal, whose signal level varies in accordance with a row of pits formed in the optical disk, as a result of processing a light-reception result obtained by reception of returning light obtained from the optical disk by a predetermined light-receiving element, and by processing the reproduction signal. In contrast, in writing data in the optical disk device, the shape of a pit which is formed in the optical disk is monitored by monitoring the level of the reproduction signal, and the light beam quantity is properly controlled based on a monitoring result.

FIG. 1 is a block diagram of this type of optical disk device. In an optical disk device 1, an optical pickup 2 irradiates an optical disk 3 with laser beams, receives returning laser beams, and outputs a light-reception result.

Here, in the optical pickup 2, a semiconductor laser 4 emits laser beams, and a grating 5 diffracts the laser beams to generate diffracted light beams of $0^{th}$ and $\pm 1^{st}$ order. A beam splitter 6 transmits and reflects the diffracted light beams of the $0^{th}$ and $\pm 1^{st}$ order which exist from the grating 5 and splits them into two beams.

A light-receiving element 7 receives the light beams transmitted through the beam splitter 6, and outputs a laser beam quantity detection result. In the optical disk device 1, driving of the semiconductor laser 4 is controlled by the laser beam quantity detection result, thereby preventing the laser beam quantity from varying with changes in temperature and time-lapse changes.

A collimator lens 8 causes the laser beams reflected by the beam splitter 6 to exit therefrom as parallel light beams. A mirror 9 causes the light beams to exit towards the optical disk 3 by reflecting the laser beams that exit from the collimator lens 8, and an objective lens 10 focuses the laser beams obtained from the mirror 9 onto an information recording surface of the optical disk 3. By this, in the optical pickup 2, returning laser beams are obtained by the optical disk 3, and the returning laser beams travel in a light path of the laser beams in the opposite direction and are transmitted through the beam splitter 6.

An adjusting lens 11 corrects astigmatism in terms of the returning laser beams transmitted through the beam splitter 6 and outputs the corrected result. A light-receiving element 12 receives the returning light beams that exit from the adjusting lens 11. In the optical disk device 1, a light-reception result obtained from the light-receiving element 12 is processed by a signal processing circuit 13 to generate a reproduction signal RF and signals TE and FE which are required for various controlling operations.

More specifically, the grating 5 is set so that, in the optical disk device 1, as shown in FIG. 2, when a beam spot SPM of the $0^{th}$ diffraction light beam (that is, a main beam) scans a recording track of the optical disk 3 by a just tracking operation, beam spots SP1 and SP-1 of the $\pm 1^{st}$ order diffraction light beams (that is, side beams) are set at locations that are offset by approximately ½ track pitch P/2 in the inner and outer peripheral directions of the optical disk 3, respectively, and scan a forward location and a rearward location in the circumferential direction, respectively.

In correspondence with this, in the light-receiving element 12, the returning main beam and returning side beams are received by respective light-receiving surfaces 12M, 12S1, and 12S-1. Here, the light-receiving surface 12M that receives the returning main beam is divided into four parts by division lines in the circumferential and radial directions of the optical disk 3. Light-reception results obtained from respective areas A to D that are divided in this way are output. In contrast, the light-receiving surfaces 12S1 and 12S-1 that receive their respective side beams are each divided into two parts by division lines in the circumferential direction of the optical disk 3. Light-reception results obtained from respective areas E and F and G and H that are divided in this way are output.

After the signal processing circuit 13 has processed the light-reception result obtained from the light-receiving element 7 and the light-reception results obtained from the respective areas A to H of the light-receiving element 12 by current-voltage conversion, it outputs the light-reception result obtained from the light-receiving element 7 to a light-quantity control circuit 14 (see FIG. 1), whereas it processes the light-reception results obtained from the respective areas A to H by a predetermined computation in order to generate the tracking error signal TE, the focus error signal FE, and the reproduction signal RF.

The light-reception results after the current-voltage conversion are represented below by reference characters A to H used to represent the areas of the light-receiving surface. The tracking error signal TE is generated by performing a computation using $((A+D)-(B+C))-k\ ((F-E)+(H-G))$. Here, k is a predetermined coefficient. By this, the optical disk device 1 generates the tracking error signal TE by what is called a DPP method.

The focus error signal FE is generated by a computation using $((A+C)-(B+D))$. In the computation, the light-reception results obtained from the areas in the diagonal directions of the light-receiving surface 12M which receives the returning main beam are added, and the difference between these sums is computed. The reproduction signal RF is generated by performing a computation using $(A+C+B+D)$. In the computation, each of the light-reception results obtained from the light-receiving surface 12M which receives the returning main beam is added.

By these computations, in the optical disk device 1 (see FIG. 1), based on the tracking error signal TE and the focus error signal FE, the objective lens 10 is moved by a servo circuit 15, so that tracking control and focus control can be carried out. A reproduction signal processing circuit 16 processes the reproduction signal RF, so that data recorded on the optical disk 3 can be reproduced.

On the other hand, the light quantity control circuit 14 controls operation of a driver 17 based on the light-reception result obtained from the light-receiving element 7 obtained through the signal processing circuit 13 in order to automatically adjust the light beam quantity so that the laser beam quantity does not vary with changes in temperature and time-lapse changes. When writing data, the light quantity control circuit 14 samples the reproduction signal RF at a timing based on a write pulse WP in order to detect the returning-light quantity that changes in accordance with the size of a pit which is formed in the optical disk 3. Further, the light quantity control circuit 14 controls the operation of the driver 17 by the laser beam quantity detection result in order to control the shape of a pit which is formed in the optical disk 3.

When reproducing data, the driver 17 drives the semiconductor laser 4 so that, by the controlling operation of the light-quantity control circuit 14, the semiconductor laser 4 emits laser beams of a certain quantity. On the other hand, when writing data, the driver 17 drives the semiconductor laser 4 so that, based on the write pulse WP that is generated by modulating data that is to be written, the laser beam quantity is intermittently set at the writing laser beam quantity.

In recent years, such an optical disk device has provided considerably increased writing speed. In the optical disk device, when the writing speed is made high, the speed of laser beams which scan the optical disk 3 is increased correspondingly. Therefore, an information recording surface reliably undergoes a thermal change in order to form a pit even by increasing the laser beam quantity and scanning the information recording surface with the laser beams for a short period of time.

However, in a related optical disk device, when the writing speed is increased, the shape of a pit which is formed in the optical disk 3 can no longer be accurately monitored, so that the light beam quantity can no longer be properly controlled.

In other words, in this type of optical disk, the temperature of the information recording surface is gradually increased as a result of setting the light beam quantity at the writing light beam quantity, so that the temperatures of localized portions of the information recording surface are increased to temperatures equal to or greater than a predetermined temperature by this increase in temperature of the information recording surface. Therefore, the localized portions of the information recording surface undergo thermal changes, thereby forming the pits. Because of this, in the optical disk, a time lag is produced from the time the light beam quantity is set at the writing light beam quantity to the time the pits are formed.

When the writing speed is increased, the speed of scanning with laser beams is increased with respect to this time lag. Therefore, before the information recording surface undergoes a thermal change, a spot of a laser beam moves, so that the shape of the pits which are formed in the optical disk 3 can no longer be accurately monitored.

More specifically, FIG. 3 is a graph showing a characteristic curve of the result of measurement of a light quantity that is detected by sampling the reproduction signal RF, when a desired piece of data is recorded onto a CD-R by successively changing a writing light quantity and increasing the writing speed by 8 times in value. According to the result of measurement, it can be understood that, at a write power equal to or greater than a predetermined power, formation of a pit resulting in a lower reflectance than that of a land is started, and a signal level of a light-reception result is reduced in accordance with the size of the pit. Therefore, in this case, it can be said that the writing light quantity is properly controlled.

In the optical disk device, when the writing speed is further increased, such a reduction in the signal level of the light-reception result caused by an increase in the writing light quantity is no longer observed, so that the shape of the pit which is formed in the optical disk 3 can no longer be accurately monitored.

DISCLOSURE OF INVENTION

The present invention has been achieved in view of the above-described points, and tries to provide an optical disk device which can accurately monitor, for example, the shape of a pit which is formed in an optical disk even if a writing speed is made high, and an optical disk recording method.

In order to overcome the above-described problems, the present invention is applied to an optical disk device for controlling a writing light quantity based on light-reception results that are obtained from areas at the back side in the direction of scanning with laser beams among light-reception results obtained from a plurality of areas of a light-receiving element.

In an optical disk, the temperature of an information recording surface is gradually increased as a result of setting a light beam quantity at a writing light beam quantity, so that the temperatures of localized portions of the information recording surface are increased to temperatures equal to or greater than a predetermined temperature by this increase in temperature of the information recording surface. Therefore, the localized portions of the information recording surface undergo thermal changes, thereby forming pits. Because of this, in the optical disk, a time lag is produced from the time the light beam quantity is set at the writing light beam quantity to the time the pits are formed. When the writing speed is increased, the speed of scanning with laser beams is relatively increased with respect to this time lag. Therefore, the shape of the pits which are formed in the optical disk 3 can no longer be accurately monitored. However, even in such a case, at the back side in the direction of scanning with a beam spot, the information recording surface undergoes sufficient thermal change, so that the formations of pits or marks can be monitored. Accordingly, the structure of the present invention is applied to an optical disk device for controlling a writing light quantity based on the light-reception results obtained from the areas at the back side in the direction of scanning with laser beams among the light-reception results obtained from the plurality of areas of the light-receiving element in order to make it possible to, even if the writing speed is made high, control the writing light quantity by accurately monitoring, for example, the shape of a pit which is formed in the optical disk.

In addition, the present invention is applied to an optical disk recording method in which a quantity of laser beams that enter the optical disk is intermittently set at a writing laser beam quantity in order to form a row of pits or marks in the optical disk. The application of the present invention to the method makes it possible to receive a returning laser beam by a light-receiving element in order to control the writing laser beam quantity based on a returning-light-reception result that is obtained from areas at the back side in the direction of scanning with laser beams of the light-receiving element.

The present invention can provide an optical disk recording method which makes it possible to, even if the writing speed is made high, control the writing light quantity by accurately monitoring, for example, the shape of a pit which is formed in the optical disk.

BEST MODE FOR CARRYING OUT THE INVENTION

Hereunder, embodiments of the present invention will be described in detail with reference to the appropriate drawings.

(1) First Embodiment (1-1) Structural Features of the First Embodiment

Figure 1:
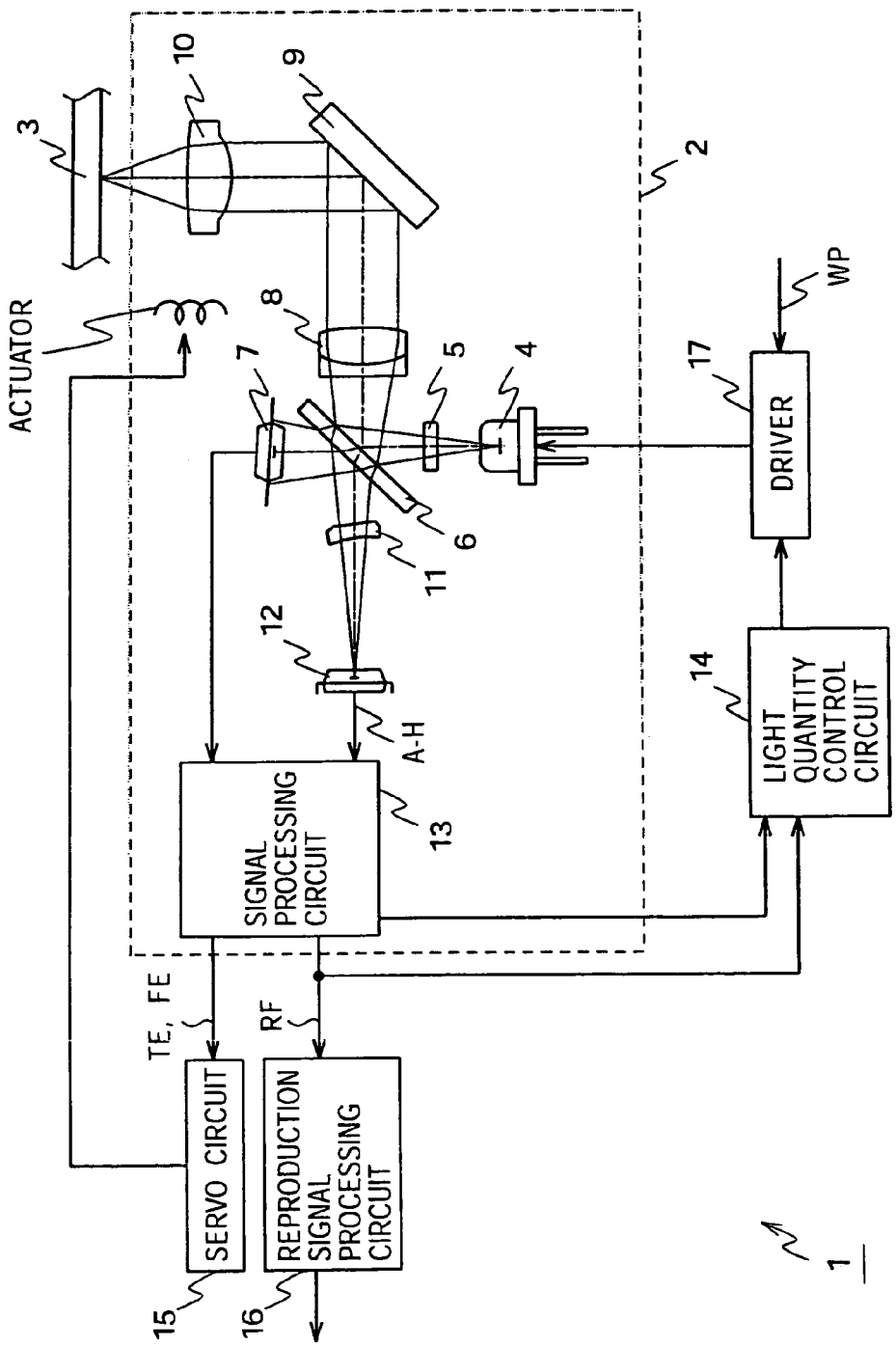
FIG. 1 is a block diagram of a related optical disk device.
Figure 2:
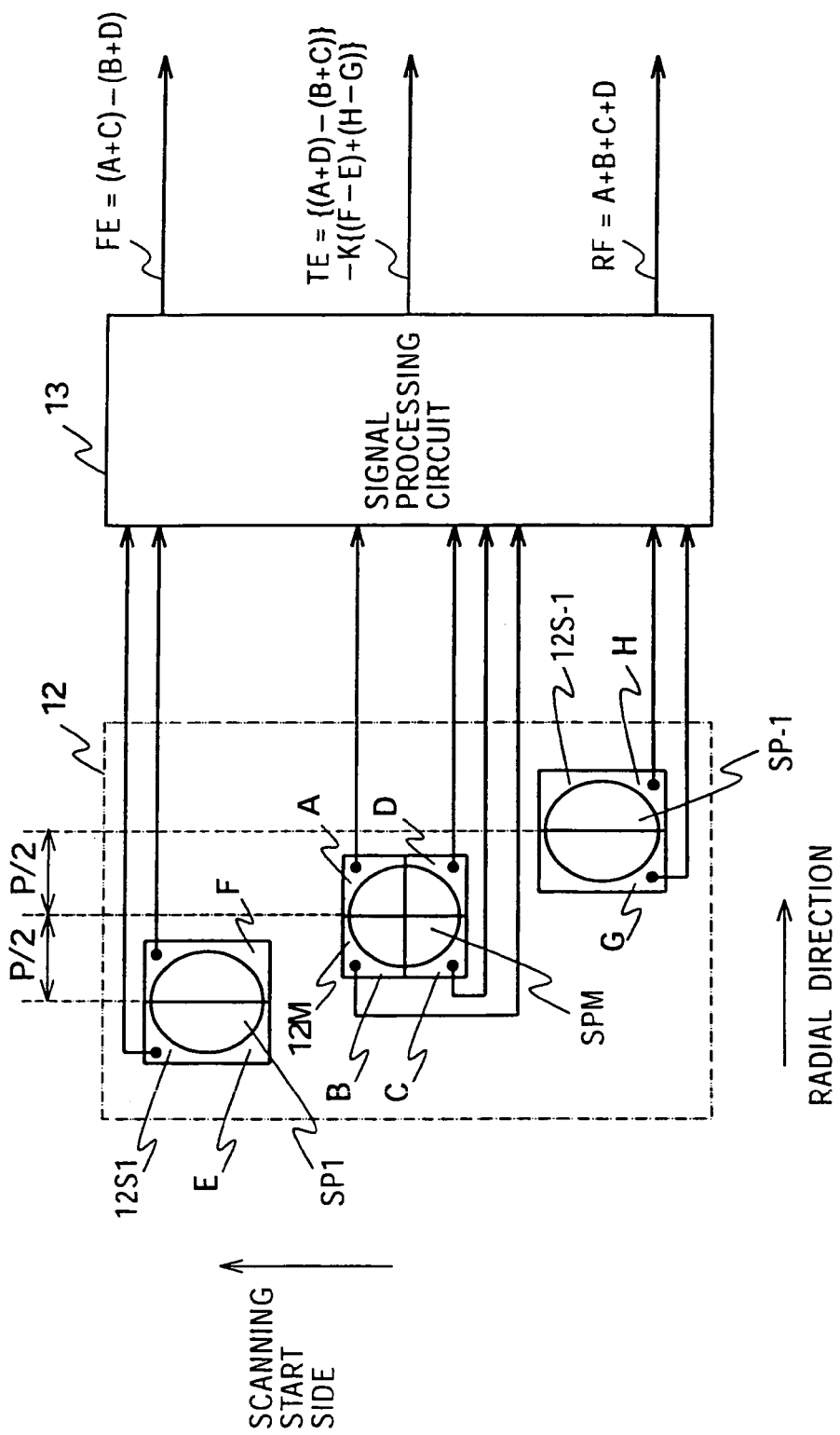
FIG. 2 is a block diagram showing in detail the structure of a light-receiving element and a portion around the light-receiving element in the optical disk device shown in FIG. 1.
Figure 4:
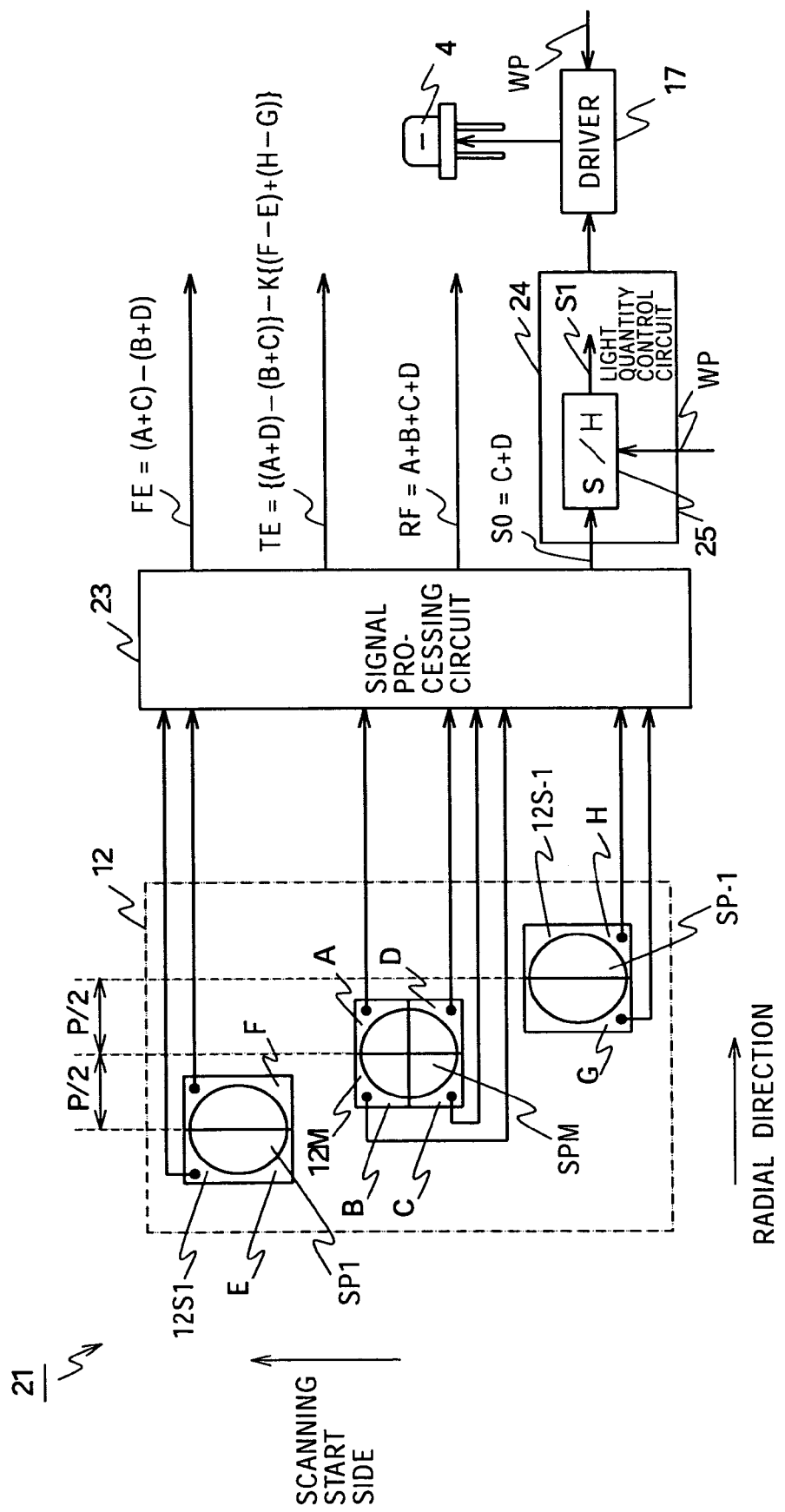
FIG. 4 is a block diagram of an optical disk device of a first embodiment of the present invention.

FIG. 4 is a block diagram showing an optical disk device of a first embodiment of the present invention by contrast with the optical disk device shown in FIG. 2. An optical disk device 21 has the same structure as the above-described optical disk device shown in FIG. 1 except that a signal processing circuit 23 and a light quantity control circuit 24 are used in place of the signal processing circuit 13 and the light quantity control circuit 14.

Like the signal processing circuit 13, the signal processing circuit 23 processes light-reception results that are obtained from the areas A to H of the light-receiving element 12 in order to generate the tracking error signal TE, the focus error signal FE, and the reproduction signal RF. In addition, the signal processing circuit 23 adds the light-reception results that are obtained from the areas C and D at the back side in the direction of scanning with laser beams of the light-receiving surface 12M which receives a returning main beam of the light-receiving element 12, and outputs an addition signal S0 (C+D).

Figure 3:
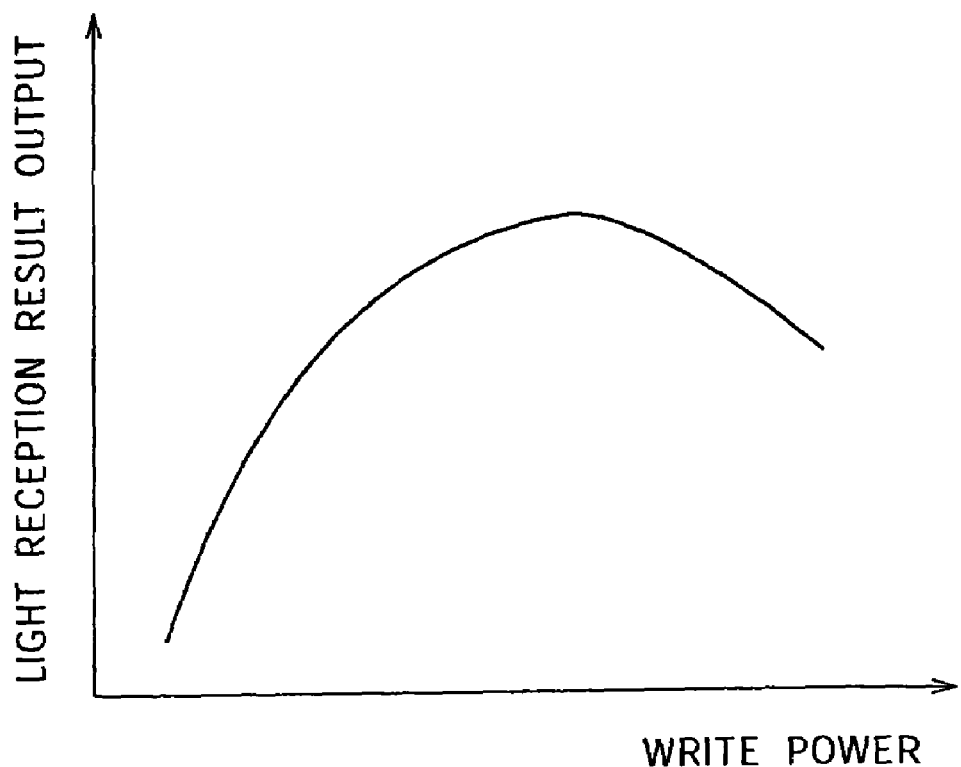
FIG. 3 is a graph of a characteristic curve illustrating a light-reception result in the optical disk device shown in FIG. 1.
Figure 5:
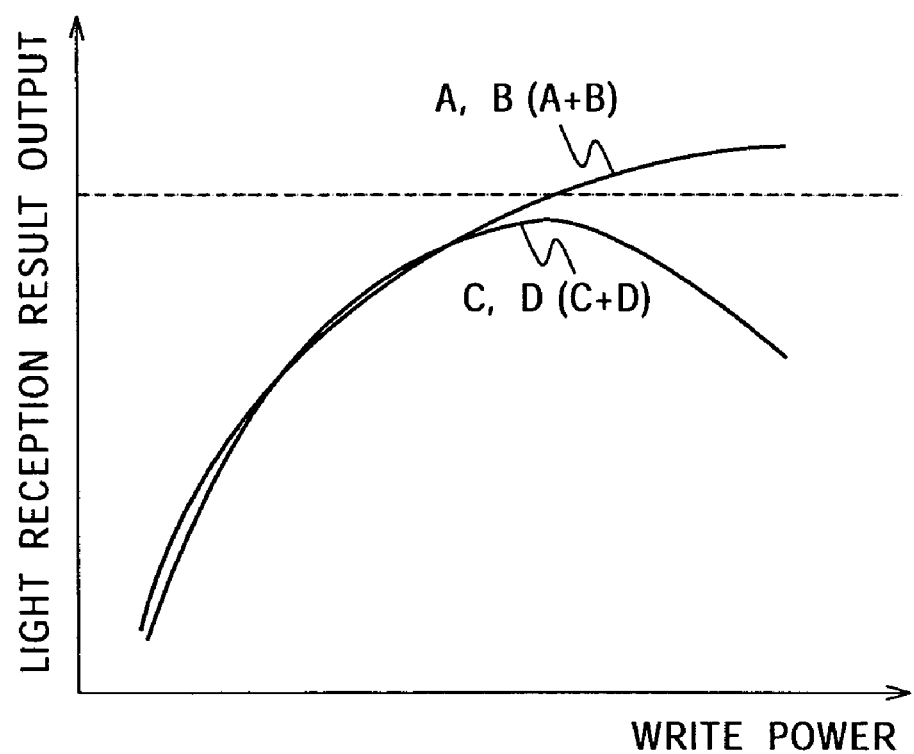
FIG. 5 is a graph of a characteristic curve illustrating an operation of the optical disk device shown in FIG. 4.

The light quantity control circuit 24 controls a writing light quantity based on a light-reception result produced by the addition signal S0 (C+D) that is obtained from the back side in the direction of scanning with laser beams. In other words, as shown in FIG. 5 which is provided in contrast to FIG. 3, a detailed observation of the light-reception results obtained from the light-receiving element 12 showed that, in the case where the shape of a pit which is formed in the optical disk 3 can no longer be accurately monitored based on the reproduction signal RF due to a high writing speed, even for light-reception results A and B that are obtained from the areas A and B at a scanning start side, a signal level no longer changes so as to accurately reflect the shape of the pit because it is not affected by a reduction in disk reflectance caused by the formation of the pit. In other words, here, with regard to the reproduction signal RF and the light-reception results A and B, the light-reception results A and B increase in value and exceed a dynamic range of a circuit system with an increase in the writing light quantity, so that a change in the signal level reaches a saturation level.

However, it was found that, with regard to light-reception results C and D that are obtained from the areas C and D at the back side in the scanning direction, even in such a case, the signal level changes in accordance with the writing light quantity, so that the shape of a pit which is formed in the optical disk 3 is properly reflected. The result of measurement shown in FIG. 5 is the result when the writing speed is increased by 16 times in value.

This is because, even if the shape of a pit which is formed in the optical disk 3 can no longer be accurately monitored by the reproduction signal RF due to increased speed of scanning with laser beams with respect to a time lag from the time the laser beam quantity is set at the writing laser beam quantity to the time the pit is formed, the information recording surface sufficiently undergoes a thermal change at the back side in the direction of scanning with a beam spot.

By this, a sample hold circuit 25 in the light quantity control circuit 24 of the optical disk device 21 sample holds the addition signal S0 based on the write pulse signal WP in order to sample the light-reception result S0 at a timing in accordance with the intermittent setting of the laser beam quantity at the writing laser beam quantity. By this, the light quantity control circuit 24 obtains a returning-light-reception result at a timing in which the information recording surface sufficiently undergoes a thermal change. The light quantity control circuit 24 controls operation of the driver 17 so that the light-reception result that is obtained in this way becomes a predetermined value, thereby setting the laser beam quantity for writing at which the laser beam quantity is intermittently set at a suitable quantity for the optical disk 3.

(1-2) Operation of the First Embodiment

In the optical disk device 21 having the above-described structure (see FIG. 1), laser beams emitted from the semiconductor laser 4 are each split into two laser beams by the beam splitter 6, and one of the laser beams is focused onto the information recording surface of the optical disk 3 by the objective lens 10. A returning laser beam that is obtained as a result of this is received by the light-receiving element 12. In the optical disk device 21, the tracking error signal TE and the focus error signal FE are generated from the light-reception result, and are used in order to perform a tracking control and a focus control operation on the objective lens 10 by the servo circuit 15. The reproduction signal RF is generated by the light-reception results obtained from the light-receiving element 12, and the reproduction signal processing circuit 16 processes the reproduction signal RF in order to reproduce information recorded on the optical disk 3.

The quantity of laser beams which enter the optical disk 3 in this manner is intermittently set in accordance with data which is recorded, so that localized portions of the information recording surface undergo a thermal change, thereby successively forming a row of pits in the optical disk 3 and recording a desired piece of data.

When operations are being carried out in this way, in the optical disk device 21, the light-receiving element 7 monitors the laser beam quantity, and the light quantity control circuit 24 controls the laser beam quantity based on a monitoring result in order to correct changes in the laser beam quantity caused by changes in temperature and time-elapse changes of the semiconductor laser 4.

The light quantity control circuit 24 samples the returning-light-reception result obtained from the light-receiving element 12 at a timing in accordance with the intermittent setting of the laser beam quantity at the writing laser beam quantity, so that the shape of a pit which is formed in the information recording surface of the optical disk 3 is monitored by the light-quantity control circuit 24. By this, in the optical disk device 21, the writing laser beam quantity is controlled so that the monitoring result becomes a predetermined value, thereby making it possible to control the shape of the pit.

In the optical disk device 21, when the pit is formed with a time lag from the time of setting the laser beam quantity at the writing laser beam quantity by obtaining the returning-light result used to monitor the shape of the pit from the back side in the direction of scanning with laser beams, even if a beam spot is moved, the portions that sufficiently undergo a thermal change of the information recording surface can be selectively monitored. Therefore, it is possible to properly control the writing light quantity by accurately monitoring the shape of the pit which is formed in the optical disk.

(1-3) Advantages of the First Embodiment

According to the above-described structure, light-quantity detection results obtained from the areas at the back side in the direction of scanning with laser beams are selectively used in order to monitor the shape of pits which are formed in the optical disk 3, so that, even if the writing speed is increased, the shape of the pits which are formed in the optical disk can be accurately monitored. Therefore, it is possible to stably and reliably record a desired piece of data onto the optical disk 3.

Since the areas at the back side in the direction of scanning with laser beams are areas of a part of the light-receiving surface that receive a main beam and generates, for example, a reproduction signal and a tracking error signal, it is possible to accurately monitor the shape of a pit which is formed in the optical disk using a related structure.

With regard to the light-receiving surface which receives the main beam, the light-reception results obtained from the areas C and D at the inner and outer peripheral portions at the back side in the scanning direction are added, so that it is possible to correspondingly increase the SN ratio of the light-reception results to reliably monitor the shape of a pit which is formed in the optical disk.

(2) Second Embodiment

Figure 6:
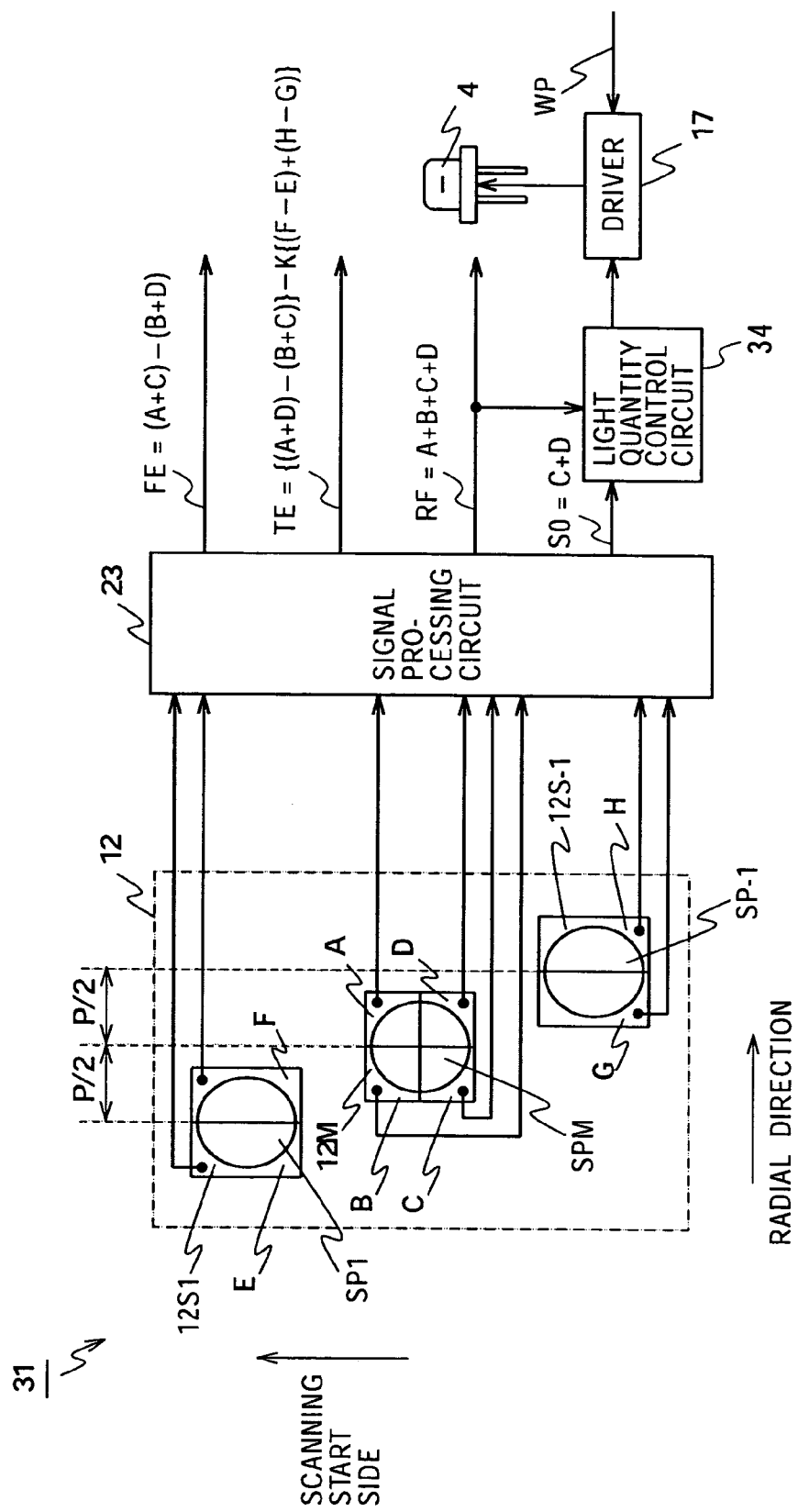
FIG. 6 is a block diagram of an optical disk device of a second embodiment of the present invention.

FIG. 6 is a block diagram showing an optical disk device of a second embodiment of the present invention by contrast with the optical disk device shown in FIG. 4. In an optical disk device 31, a laser beam quantity is controlled by a light quantity control circuit 34 instead of the light-quantity control circuit 24.

In reproducing data, like the related light-quantity control circuit 14, the light quantity control circuit 34 controls the laser beam quantity so that a light-reception result obtained from the light-receiving element 7 becomes a predetermined value in order to correct changes in the laser beam quantity caused by changes in temperature and time-elapse changes of the semiconductor laser 4.

In the reproducing of data, the light quantity control circuit 34 samples the reproduction signal RF and the addition signal S0 level at a predetermined timing, and processes the sampling value, in order to detect a ratio (A+B+C+D)/(C+D) between a quantity of returning light that is incident upon the entire light-receiving surface 12M which receives a main beam and a quantity of returning light incident upon the areas C and D at the back side in the scanning direction of the light-receiving surface 12M.

The light quantity control circuit 34 records the light quantity ratio (A+B+C+D)/(C+D) into a memory and holds it there. At the time of writing data, after the light quantity control circuit 34 has sampled a light-reception result (C+D) obtained from the areas C and D at the back side in the scanning direction at a timing in accordance with intermittent setting of the laser beam quantity at the writing laser beam quantity, it multiplies the light quantity ratio (A+B+C+D)/(C+D) and the sampling value. By this, based on a light-reception result at the time of reproducing data, the light quantity control circuit 34 uses the light quantity ratio (A+B+C+D)/(C+D) to correct the light-reception result that is obtained from the areas C and D at the back side in the scanning direction in order to convert the light-reception result that is obtained from the areas C and D at the back side in the scanning direction to the light-reception result that is detected at all of the areas A to D of the light-receiving element 12 so that it corresponds to a light-reception result obtained from the light-receiving element 7 (see FIG. 1) serving as a front monitor.

Accordingly, in the optical disk device 31, even if a beam spot of a returning main beam is shifted towards the scanning-start-side areas A and B or the scanning-completion-side areas C and D, the shape of a pit which is formed in the optical disk 3 is accurately determined, so that the laser beam quantity can be controlled.

In other words, the light quantity control circuit 34 divides a light quantity detection result obtained by conversion in this way by the light-reception result obtained from the front monitor, so that the reflectance of the optical disk is computed in order to monitor the shape of the pit which is formed in the optical disk 3 by this reflectance. Here, when a pit is formed in the optical disk 3, the reflectance is reduced in this embodiment. Therefore, based on the front monitor light-reception result, the light quantity control circuit 34 controls operation of the driver 17 so that the light-quantity detection result obtained by conversion in this way becomes a predetermined value.

According to the structure shown in FIG. 6, by the ratio between the quantity of returning light incident upon the entire light-receiving surface and the quantity of returning light incident upon the areas at the back side in the scanning direction, the light-reception result obtained from the areas at the back side in the scanning direction is corrected, so that it is possible to monitor the shape of a pit which is formed in the optical disk with even higher accuracy.

(3) Third Embodiment

In this embodiment, instead of correcting the light-reception result obtained from the areas C and D at the back side in the scanning direction using the light quantity ratio (A+B+C+D)/(C+D) as in the second embodiment, a light-reception result obtained from the light-receiving element 7 serving as a front monitor is corrected using the light quantity ratio (A+B+C+D)/(C+D). By this, in this embodiment, instead of converting the light-reception result obtained from the areas C and D at the back side in the scanning direction to the light-reception result that is detected at all of the areas A to D of the light-receiving element 12 so as to correspond to the light-reception result obtained from the light-receiving element 7, the light-reception result obtained from the front monitor is converted so as to correspond to the light-reception result obtained from the areas C and D at the back side in the scanning direction. The third embodiment has the same structural features as the second embodiment except in this conversion operation. Therefore, repetitive explanations will be omitted.

More specifically, in this embodiment, like the light quantity control circuit used in the second embodiment, when reproducing data, the light quantity control circuit controls a laser beam quantity so that the light-reception result obtained from the light-receiving element 7 becomes a predetermined value, and samples the reproduction signal RF and addition signal S0 level at a predetermined timing in order to detect the light quantity ratio (A+B+C+D)/(C+D) and to store it in a memory.

On the other hand, when writing data, the light quantity control circuit divides the light-reception result obtained from the light-receiving element 7 serving as a front monitor by the light quantity ratio (A+B+C+D)/(C+D) in order to correct the light-reception result so that it corresponds to the light-reception result obtained from the areas C and D at the back side in the scanning direction. Then, the light quantity control circuit divides the light-reception result obtained from the areas C and D at the back side in the scanning direction by the correction result in order to compute the reflectance of the optical disk. Thereafter, based on the reflectance, the light quantity control circuit monitors the shape of a pit which is formed in the optical disk 3 in order to, based on the light-reception result obtained from the front monitor, control the operation of the driver 17 so that the light quantity detection result obtained from the areas C and D at the back side in the scanning direction becomes a predetermined value.

Even by correcting the light-reception result obtained from the front monitor by the light quantity ratio as in this embodiment, the same advantages as those of the second embodiment can be provided.

(4) Other Embodiments

Although, in the second embodiment, the light-reception result that is obtained from the areas at the back side in the scanning direction is merely converted and corrected by a light quantity ratio, the present invention is not limited thereto, so that various other correction methods may be widely used. For example, since the returning light has a light quantity distribution similar to that of the laser beam, a method for correcting the light-reception result that is obtained from the areas at the back side in the scanning direction by computing a correction value by the light quantity ratio so as to reflect this light quantity distribution may be used.

Although, in the second embodiment, the light-reception result obtained from the entire light-receiving element is divided by the light-reception result that is obtained from the areas at the back side in the scanning direction in order to compute a light quantity ratio, the present invention is not limited thereto. It is possible to, by computing a ratio between the light quantity of the areas at the back side in the scanning direction and the areas at the scanning start side, indirectly compute a ratio between a light quantity of the light-reception result obtained from the entire light-receiving surface and a light quantity of the areas at the back side in the scanning direction in order to correct the light-reception result by this computed result.

Although, in the above-described embodiments, the shape of a pit which is formed in the optical disk is monitored using the areas which receive a main beam, the present invention is not limited thereto. The point is that the shape of a pit which is formed in the optical disk can be accurately monitored by monitoring the shape of the pit by the light-reception result that is obtained from the areas at the back side in the scanning direction. For example, a light-reception result obtained from the back side of a light-receiving surface which receives a side beam may be used.

Although, in the above-described embodiments, the present invention is applied to an optical disk device having a structure for performing tracking control by a three-spot technique, the present invention is not limited thereto. The present invention may be widely applied to optical disk devices using various tracking control methods and focus control methods.

Although, in the above-described embodiments, the present invention is applied to an optical disk device using what is called a front monitoring method, the present invention is not limited thereto. The present invention may be widely applied to an optical disk device using a rear monitoring method.

Although, in the above-described embodiments, the present invention is applied to an optical disk device which records data onto a CD-R, the present invention is not limited thereto. For example, the present invention may be widely applied to other optical disk devices which record various pieces of information by heating localized portions of an information recording surface by irradiating it with laser beams, such as optical disk devices which record data onto a phase-change optical disk.

As described above, according to the present invention, even if writing speed is made high, for example, the shape of a pit which is formed in an optical disk can be accurately monitored by selectively using a light quantity detection result obtained from the areas at the back side in the direction of scanning with laser beams.

INDUSTRIAL APPLICABILITY

The present invention relates to an optical disk device and an optical disk recoding method, and may be used to record data onto, for example, an organic dye type recording medium such as a CD-R (compact disc recordable).

The invention claimed is:

1. An optical disk device for forming a row of pits or marks in an optical disk by intermittently setting a quantity of laser beams that enter the optical disk at a writing laser beam quantity, the optical disk device comprising:
a light-receiving element configured to receive returning laser beams;
a servo mechanism configured to perform a tracking control operation and a focus control operation on an objective lens based on a light-reception result obtained from the light receiving element, the objective lens configured to focus the laser beams onto the optical disk; and
a light quantity controlling means for controlling the writing laser beam quantity based on the light-reception result obtained from the light-receiving element,
wherein the light-receiving element is configured to receive the returning laser beams at a plurality of areas that output respective light-reception results;
wherein the light quantity controlling means controls the writing laser beam quantity based on the light-reception results obtained from areas at a back side in a direction of scanning with the laser beams of the light-receiving element among the light-reception results obtained from the plurality of areas of the light-receiving element;
wherein the optical disk irradiated with the laser beams is irradiated with main beams and side beams, and wherein the light-receiving element includes a light-receiving surface configured to receive returning main beams, the light-receiving surface comprising the plurality of areas that are divided by division lines extending in a radial direction and a circumferential direction of the optical disk; and
wherein the light quantity controlling means detects, from a quantity of the laser beams at which it is difficult to form the row of pits or marks in the optical disk, a ratio of a quantity of laser beams of the light-reception results obtained from the areas at the back side in the scanning direction with respect to a light beam quantity of the light-reception results detected at the plurality of areas, and, based on the laser beam quantity ratio, corrects the light-reception results obtained from the areas at the back side in the scanning direction in order to control the writing laser beam quantity.

2. An optical disk device according to claim 1, wherein the light quantity controlling means samples the light-reception result at a timing in accordance with the intermittent setting of the quantity of laser beams at the writing laser beam quantity in order to control the writing laser beam quantity based on the sampling result.

3. An optical disk device for forming a row of pits or marks in an optical disk by intermittently setting a quantity of laser beams that enter the optical disk at a writing laser beam quantity, the optical disk device comprising:

a light-receiving element configured to receive returning laser beams;

a servo mechanism configured to perform a tracking control operation and a focus control operation on an objective lens based on a light-reception result obtained from the light receiving element, the objective lens configured to focus the laser beams onto the optical disk; and a light quantity controlling means for controlling the writing laser beam quantity based on the light-reception result obtained from the light-receiving element, wherein the light-receiving element is configured to receive the returning laser beams at a plurality of areas that output respective light-reception results, and wherein the light quantity controlling means controls the writing laser beam quantity based on the light-reception results obtained from areas at a back side in a direction of scanning with the laser beams of the light-receiving element among the light-reception results obtained from the plurality of areas of the light-receiving element, wherein the optical disk irradiated with the laser beams is irradiated with main beams and side beams, and wherein the light-receiving element includes a light-receiving surface configured to receive returning main beams, the light-receiving surface comprising the plurality of areas that are divided by division lines extending in a radial direction and a circumferential direction of the optical disk, wherein the optical disk device further comprises:

a monitoring light-receiving element for outputting a monitoring light quantity detection result that indicates the quantity of laser beams, wherein the light quantity controlling means detects, from a quantity of the laser beams at which it is difficult to form the row of pits or marks in the optical disk, a ratio of a quantity of laser beams of the light-reception results obtained from the areas at the back side in the scanning direction with respect to a light beam quantity of the light-reception results detected at the plurality of areas;

corrects the monitoring light quantity detection result by the laser beam quantity ratio so as to correspond to the light-reception results obtained from the areas at the back side in the scanning direction; and controls the writing laser beam quantity by the corrected light-quantity light-reception result and the light-reception results obtained from the areas at the back side in the scanning direction.

4. The optical disk device of claim 3, wherein the light quantity controlling means samples the light-reception result at a timing in accordance with the intermittent setting of the quantity of laser beams at the writing laser beam quantity in order to control the writing laser beam quantity based on the sampling result.

5. An optical disk recoding method for forming a row of pits or marks in an optical disk by intermittently setting a quantity of laser beams that enter the optical disk at a writing laser beam quantity, the method comprising:

receiving returning laser beams, among the laser beams that enter the optical disk by a light-receiving element; and controlling the writing laser beam quantity based on returning light reception results obtained from areas at a back side in a direction of scanning with the laser beams of the light-receiving element, wherein the optical disk irradiated with the laser beams is irradiated with main beams and side beams, and wherein the light-receiving element includes a light-receiving surface configured to receive returning main beams, the light-receiving surface comprising the plurality of areas that are divided by division lines extending in a radial direction and a circumferential direction of the optical disk; and wherein the light quantity controlling means detects, from a quantity of the laser beams at which it is difficult to form the row of pits or marks in the optical disk, a ratio of a quantity of laser beams of the light-reception results obtained from the areas at the back side in the scanning direction with respect to a light beam quantity of the light-reception results detected at the plurality of areas, and, based on the laser beam quantity ratio, corrects the light-reception results obtained from the areas at the back side in the scanning direction in order to control the writing laser beam quantity.

* * * * *